United States Patent
De Vaan

(10) Patent No.: US 7,891,822 B2
(45) Date of Patent: Feb. 22, 2011

(54) HANDHELD PROJECTION DEVICE

(75) Inventor: Adrianus Johannes Stephanes Maria De Vaan, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 796 days.

(21) Appl. No.: 11/568,462

(22) PCT Filed: Apr. 21, 2005

(86) PCT No.: PCT/IB2005/051309

§ 371 (c)(1),
(2), (4) Date: Oct. 30, 2006

(87) PCT Pub. No.: WO2005/107269

PCT Pub. Date: Nov. 10, 2005

(65) Prior Publication Data

US 2007/0229772 A1    Oct. 4, 2007

(30) Foreign Application Priority Data

Apr. 29, 2004    (EP)    ................................. 04101806

(51) Int. Cl.
*G03B 21/00*    (2006.01)
*H05B 37/00*    (2006.01)
*H05B 39/00*    (2006.01)

(52) U.S. Cl. ........................................ 353/85; 315/160

(58) Field of Classification Search .................. 353/85, 353/122; 315/307, 86, 160, 295; 352/198; 348/14.01–14.16

See application file for complete search history.

(56) References Cited

U.S. PATENT DOCUMENTS

| | | | | |
|---|---|---|---|---|
| 5,258,844 A | * | 11/1993 | Nakayama et al. | ........ 348/333.1 |
| 5,347,324 A | * | 9/1994 | Sasaki et al. | ................ 348/789 |
| 6,189,106 B1 | | 2/2001 | Anderson | |
| 6,265,846 B1 | * | 7/2001 | Flechsig et al. | ............. 320/116 |
| 6,900,820 B2 | * | 5/2005 | Kataoka et al. | ............. 345/690 |
| 7,052,138 B2 | * | 5/2006 | Matsui | ....................... 353/31 |
| 2002/0063855 A1 | | 5/2002 | Williams | |
| 2003/0011751 A1 | * | 1/2003 | Sakata et al. | .................. 353/30 |

(Continued)

FOREIGN PATENT DOCUMENTS

EP    1100277 A1    5/2001

(Continued)

OTHER PUBLICATIONS

Mamiya et al., JP 04323630A English Translation, Nov. 12, 1992.*

*Primary Examiner*—Georgia Y Epps
*Assistant Examiner*—Ryan Howard

(57) ABSTRACT

The invention relates to a handheld projection system (10) comprising a projection device (14, 18, 20) for projecting an image onto a projection surface (24). The projection device has at least two drive power modes associated with different qualities of the projected image. The handheld projection system further comprises a selection device (17) for selecting one of said at least two drive power modes on the basis of the currently selected power source of the system, so that the quality of the projected image is adjusted on the basis of the power source of the handheld projection system. The handheld projection system according to the invention may easily be adapted to different situations of usage involving different requirements when it comes to projected image quality and device properties.

18 Claims, 2 Drawing Sheets

| U.S. PATENT DOCUMENTS | | | |
|---|---|---|---|
| 2003/0107883 A1 | 6/2003 | Peinimaa et al. | |
| 2004/0017518 A1 | 1/2004 | Stern et al. | |

FOREIGN PATENT DOCUMENTS

| JP | 04323630 A | | 11/1992 |
|---|---|---|---|
| JP | 05113604 A | * | 5/1993 |
| WO | 2003019287 A1 | | 3/2003 |

* cited by examiner

HANDHELD PROJECTION DEVICE

The invention relates to a handheld projection system comprising a projection device for projecting an image onto a projection surface.

Document WO 03/019287 describes a handheld system, such as a mobile phone, which comprises an LCD Logic and an LCD Driver connected to a transparent LCD display of the device. The system further comprises a light bulb producing light which is passed through the LCD display and becomes colored by passing through the pixels of the LCD display. The light then passes through a lens system so that the light may be displayed as an image on a wall. The described projection device thus enables a user of the device to display and interact with a large media display, while the size of the system is not significantly increased. The handheld system further comprises means for compensating motion of the device so that the image is kept stable at the surface. For example, when the device is moved closer to or away from the surface, adjustment of a lens within the projection means allows the image to be kept in focus.

However, a handheld system comprising such a projection device may be used in many different situations, imposing a wide variety of different requirements on the properties of the device and the projected image. For example, when the system is used by a single user on the move (i.e. when the device is not connected to the mains power line), a long battery life time and a low weight of the system, as well as an acceptable image quality and a reasonable image size are desired. However, when the system is used on the move to project and display an image for multiple viewers, there may be a demand for improved image quality (e.g. brightness and sharpness) and a larger image size. Finally, when the system is used in the stationary mode (i.e. connected to the mains power line via a power adapter), a very high brightness and quality of the projected image as well as an even larger image size may be desired, while a long battery life time and a low weight of the system may have less importance.

It is an object of the invention to provide a handheld system comprising a projection device for projecting an image onto a surface, which system meets the requirements of different modes of usage as outlined above.

These and other objects are achieved by a system of the type mentioned in the opening paragraph, wherein the projection device has at least two drive power modes associated with different qualities of the projected image, and the handheld projection system further comprises a selection device for selecting one of said at least two drive power modes on the basis of the currently selected power source of the handheld projection system, so that the quality of the projected image is adjusted on the basis of the power source of the handheld projection system.

The invention is based on the recognition that selection of the drive power mode of the projection device on the basis of the power source of the handheld projection system, which drive power mode influences the quality of the projected image as well as the power consumption of the device, allows easy adaptation of the handheld projection system to different situations of usage involving different requirements when it comes to projected image quality and device properties.

For example, the projection device may operate at a low drive power mode (i.e. a low image quality and a low power consumption) when the system is run by a low and/or a limited power source, such as an internal battery. This mode of operation is useful, for example, in a situation in which the system is used on the move, where a low power consumption (resulting in a maximized device running time) and a minimal image quality are desired. However, the projection device may operate at a higher drive power mode (i.e. a higher image quality, but also a higher power consumption) when the system is run by a more powerful power source. This mode is useful, for example, in a situation in which the system is used to project an image to a group of people, where a maximal image quality is desired.

The selection device selects the drive power mode preferably automatically so that, when an image is to be projected, the drive power mode is automatically selected on the basis of the current power source of the system.

The handheld projection system may comprise a detection device for detecting the currently selected power source of the system, i.e. detecting the power source on which the system is currently running, wherein the drive power mode may be selected on the basis of the detected power source.

The drive power modes of the projection device are preferably related to different lumen outputs of the projection device, i.e. different drive power modes result in different degrees of brightness of the projected image.

The power source of the handheld system may be an external power source or an internal power source, such as an internal conventional battery. An external power source is usually more powerful than any internal power source and may advantageously be connected to the system in situations in which a higher quality (e.g. brighter) projected image is desired. Thus, a power source which allows projection of a brighter image does not need to be permanently incorporated in the handheld system, but may be applied when desired. This saves weight off the basic handheld system (i.e. the system not connected to any external power source) and makes it more portable as compared to the more powerful power source permanently incorporated in the handheld system.

An external power source of the handheld system may be an add-on battery, advantageously a high-capacity battery. When the handheld system is run by the add-on battery, a drive power mode is selected so that a brighter projected image of a higher quality is generated as compared to the handheld system run by, for example, an internal standard battery. Thus, the add-on battery only needs to be connected when a brighter projected image is desired.

The add-on battery is preferably incorporated in an add-on battery pack which further comprises a drive unit. The drive unit is arranged to drive the projection device at the drive power mode selected by the selection device when the add-on battery is the currently selected power source of the system. This has the advantage that the electronic components of the drive unit do not need to be incorporated in the basic handheld system, which makes it lighter in weight and enhances its portability when used without the add-on battery.

An external power source of the handheld system may alternatively be the mains power line, to which the handheld system is connected via a power adapter. The power adapter may be, for example, a battery eliminator or a charger. When the handheld system is run by the mains power line, a maximum drive power mode of the projection device is preferably selected so that the projection device generates an image having a maximum brightness (i.e. a maximum lumen output of the projection means). Selecting the "maximum" drive power mode when the device is connected to the mains power line is suitable because the mains power line is an "unlimited" power source, while power saving is not so important when the handheld device is used on the move and run by a limited internal battery.

The power adapter preferably comprises a drive unit which is arranged to drive the projection device at the drive power mode selected by the selection device when the mains power line is the current power source of the system. Similarly as stated above, this means that the electronic components of the drive unit do not need to be incorporated in the basic handheld system, which makes it lighter in weight and enhances its portability when used without connection to the mains supply line via the power adapter.

The handheld system may further comprise a switch for overriding the selected drive power mode of the projection device. For example, a manual override makes it possible to set a higher drive power mode so as to obtain a high-brightness image without establishing connections to external power sources, such as an add-on battery or the mains power supply. Alternatively, a lower drive power mode may be set in order to obtain a low-brightness image, even though the handheld system is connected to an external and/or more powerful power source.

The projection device of the handheld system may comprise at least one solid-state light source used as a light source for the projection device.

The light source may comprise, for example, at least one LED component. LEDs are, for example, turned on instantly (i.e. no run-up time), operate at low voltages, do not need UV/IR filtering or difficult cooling systems and are available in a wide range of different power consumptions. This makes LEDs suitable for use in a handheld projection system.

Alternatively, the light source may comprise at least one laser component. In this case, the projection device further comprises a scanner for scanning a laser beam originating from the at least one laser component over the projection surface.

These and other aspects of the invention will be described in more detail hereinafter with reference to the appended Figures showing preferred embodiments.

The function of the handheld projection system 10 shown in FIG. 1 will be described for three modes of operation: when the system is used as a stand-alone device, when the system is connected to an add-on battery, and when it is connected to the mains power line via a power adapter.

Figure 1:
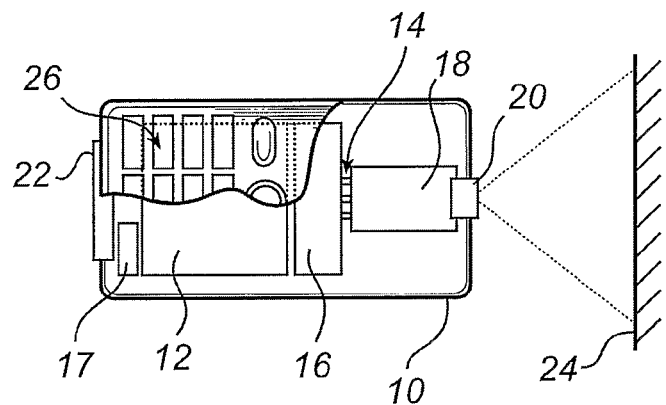
FIG. 1 shows schematically a handheld projection system according to the invention.

The handheld system 10 shown in FIG. 1 may be, for example, a mobile phone or a PDA. The basic device 10 comprises a battery 12, such as an internal light-weight standard battery, a light source 14, a drive unit 16, a microprocessor 17, a miniaturized projector 18, a projection lens 20, an interface connector 22, which allows connection of the handheld device to external accessories, and a user interface comprising a keypad 26. The light source 14 (for example, light-emitting diodes (LEDs)), the projector 18, and the projection lens 20 form part of the projection device of the handheld system. The projection device is arranged to generate an image, which is projected through the projection lens 20 onto a projection surface 24. The projection device is controlled by the drive unit and powered by the power source of the handheld device. The design and operation of the projection device will be described hereinafter in more detail.

Figure 2:
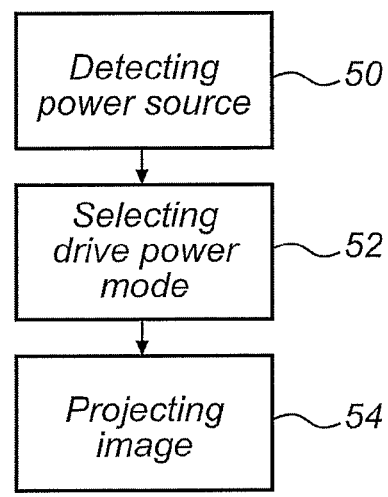
FIG. 2 is a flow chart of the basic operation of the handheld projection system according to the invention.

The basic operation of the handheld projection system according to this embodiment of the invention will now be described with reference to FIG. 2.

When the handheld projection device projects an image, the current power source of the device is first detected (step 50) by the microprocessor 17. Subsequently, the microprocessor 17 selects a drive power mode (step 52) on the basis of the detected power source. The selected drive power mode is such that the quality (e.g. brightness and/or sharpness) of the image to be projected is adjusted to a suitable level based on the detected power source by which the device is run. A suitable drive power mode can be selected automatically. Alternatively, a user of the handheld system may select the drive power mode. Finally, an image is projected (step 54) by means of the projection device, the projected image having properties that are in conformity with the selected drive power mode.

When the system 10 is used as a stand-alone device, i.e. when it is not connected to any external or additional power source and is run by the internal standard battery 12, a default drive power mode of the projection device is selected, so that a projected image having a minimal required image quality (e.g. minimal required brightness) is generated, while the battery life time is maximized. In this drive power mode, the image generation is controlled by the drive unit 16 and powered by the battery 12.

Thus, this mode of operation allows projection of an image having a satisfactory quality, while the running time of the system is maximized, which is useful, for example, in a situation in which the device is used for personal use on the move and without access to any additional power sources such as an extra battery or a charger.

Figure 3:
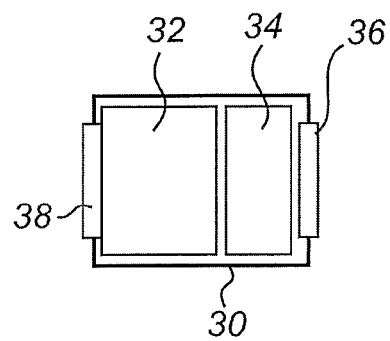
FIG. 3 shows schematically an add-on battery pack being connectable to the handheld projection system.

In another mode of operation, the system 10 is connected to an add-on battery pack 30, which is shown in FIG. 3. The add-on battery comprises a high-capacity battery 32, a drive unit 34 and an interface connector 36. The interface connector 36 matches the interface connector 22 of the system 10.

When the add-on battery pack is connected to the system 10 via the interface connectors 22 and 36 and the battery 32 is the current power source of the device, a drive power mode which is suitable for this power source is selected.

In this case, the selected drive power mode is adapted in such a way that a projected image having an intermediate brightness is generated. An "intermediate" brightness is understood to mean that the image is projected at an intermediate lumen output between zero and maximal lumen output of the light source of the projection device. When the system is run by the add-on battery and the "intermediate" drive power mode is selected, the projection device is controlled by the drive unit 34 of the add-on battery pack 30, which drive unit is especially adapted to operate the projection device at this drive power mode.

It should be noted that the add-on battery pack shown in FIG. 3 may further comprise a second interface connector 38 adapted to receive a power adapter for charging the battery 32.

Figure 4:
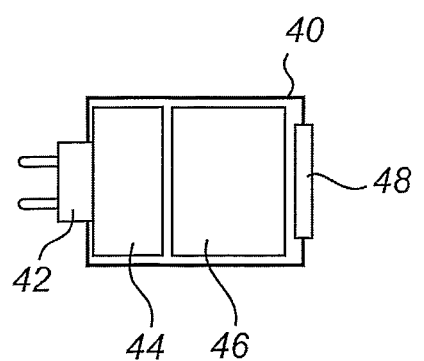
FIG. 4 shows schematically a power adapter being connectable to the handheld projection system.

In another mode of operation, the system 10 shown in FIG. 1 is connected to the mains power line via a power adapter 40, which is shown in FIG. 4. The power adapter 40 comprises a main plug 42, which is the interface to the mains power line, a transformer 44, a drive unit 46, and an interface connector 48. The interface connector 48 matches the interface connector 22 of the device 10. The power adapter may also be preferably provided with a cord (not shown) between the power adapter and the interface connector 48.

When the system 10 is connected to the mains power line via the power adapter 40, the mains power line is detected as the currently selected power source. Based on the detected power source, i.e. the mains power line in this case, a drive power mode is then manually or automatically selected for the projection device. In this case, the selected drive power mode is adapted, so that a projected image having a maximal brightness is generated. A "maximal" brightness is understood to mean that the image is projected at the maximal lumen output of the light source of the projection device. In this mode, the projection device of the system is controlled by the drive unit 46 of the power adapter 40, which drive unit is especially adapted to operate the projection device at this drive power mode.

Figure 5A:
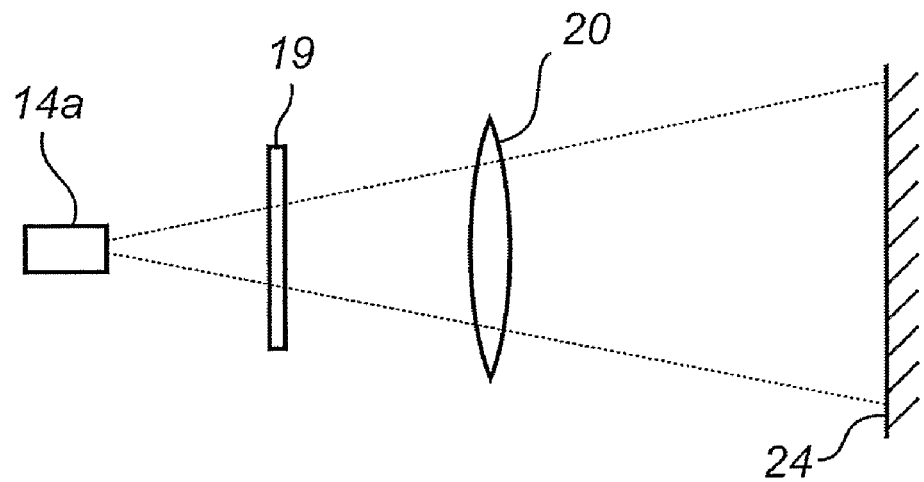
FIG. 5a shows schematically a projection device of the handheld projection system comprising at least one LED component.

The operation of the projection device of the handheld projection system 10 will now be described in more detail with reference to FIGS. 5a and 5b. In FIG. 5a, the light source is at least one light-emitting diode (LED) 14a, and the projection device comprises a transmissive image generator 19, such as an LCD, which displays the image to be projected. Light produced by the LEDs travels through the image generator and becomes colored by passing through the pixels of the light generator. The light then passes through the lens 20, so that the light may be displayed as an image on the projection surface 24.

Figure 5B:
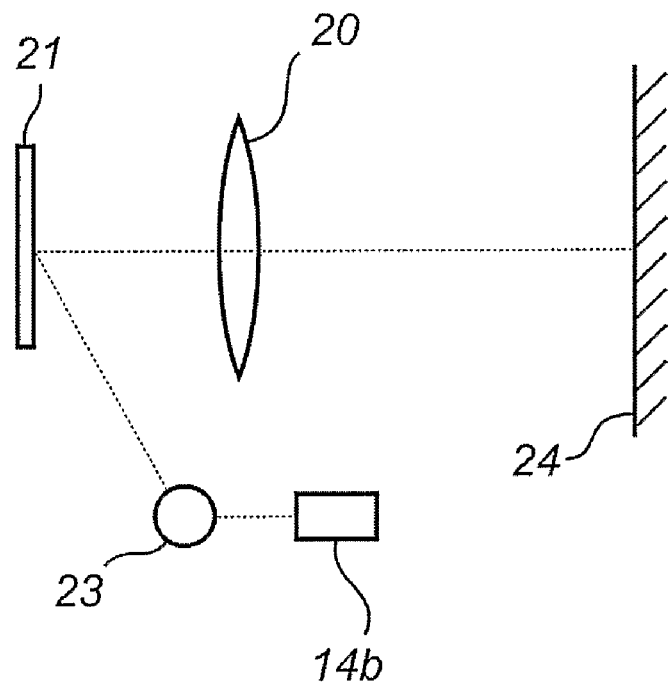
FIG. 5b shows schematically the handheld projection system comprising at least one laser component.

In FIG. 5b, the light source is at least one laser component 14b, and the projection device comprises a scanner 21, 23, here comprising a reflective image generator 21. A laser beam generated by the laser components is scanned by the scanner through the lens 20 over the projection surface 24, in the illustrated case after having been reflected by the image generator 21. It should be noted that instead of the projection device based on a LED or a scanning laser as described above, miniaturized projection systems based on other principles may be used, such as a laser-illuminated microdisplay projection system, a projection device using a scanned image of an array of modulating elements, etc.

It should also be noted that the handheld system may further comprise a switch allowing manual override of the selected drive power mode. A user of the handheld device may carry out a manual override, for example, by pressing a certain button of the keypad 26 or making a selection in a menu interface of the handheld device. For example, the manual override makes it possible to set a lower drive power mode so as to obtain a low-brightness image, even though the handheld system is connected to an external and/or more powerful power source. Alternatively, a higher drive power mode may be set in order to obtain a high-brightness image without establishing connections to external power sources, such as an add-on battery or the mains power supply. In the latter case, the basic handheld system should comprise a drive unit which makes it possible to operate the projection device of the system at the higher drive power modes.

The invention is not limited to the embodiments described above. Those skilled in the art will recognize that variations and modifications can be made without departing from the scope of the invention as defined in the appendent claims.

The invention claimed is:

1. A handheld projection system comprising:
a projection device for projecting an image onto a projection surface, wherein
the projection device has at least two drive power modes associated with different qualities of the projected image, wherein the different qualities comprise minimal, intermediate, and maximal image quality, and
the handheld projection system further comprises a microprocessor configured to implement a selection device for selecting one of said at least two drive power modes on the basis of a currently selected power source of the handheld projection system, wherein the currently selected power source comprises one of (a)(i) an internal power source internal to the projection system that includes a drive unit for use with the internal power source and (a)(ii) an external power source external to the projection system that includes a distinct drive unit for use with the external power source, wherein a respective drive unit of the currently selected power source is configured (b)(i) to control image generation of said projection device and (b)(ii) to operate the projection device at the corresponding drive power mode, so that the quality of the projected image is adjusted on the basis of the power source of the handheld projection system via the respective drive unit of the currently selected power source, wherein the external power source is an add-on battery, wherein said add-on battery is incorporated in an add-on battery pack, and said add-on battery pack further comprises the distinct drive unit for use with the external power source arranged to drive the projection device at the drive power mode selected by the selection device when said add-on battery is the currently selected power source.

2. A system as claimed in claim 1, wherein the drive power mode of the projection device is selected automatically.

3. A system as claimed in claim 1, further comprising a detection device for detecting the power source of the handheld projection system.

4. A system as claimed in claim 1, wherein said at least two drive power modes are associated with different lumen outputs of the projection device.

5. A system as claimed in claim 1, further comprising a switch for manually overriding the selection of the drive power mode made by the selection device.

6. A system as claimed in claim 1, wherein the projection device comprises at least one solid-state light source.

7. A system as claimed in claim 6, wherein said light source is at least one LED component.

8. A system as claimed in claim 6, wherein said light source is at least one laser component.

9. A system as claimed in claim 8, wherein the projection device further comprises a scanner for scanning a laser beam originating from said at least one laser component over the projection surface.

10. A handheld projection system system comprising:
a projection device for projecting an image onto a projection surface, wherein
the projection device has at least two drive power modes associated with different qualities of the projected image, wherein the different qualities comprise minimal, intermediate, and maximal image quality, and
the handheld projection system further comprises a microprocessor configured to implement a selection device for selecting one of said at least two drive power modes on the basis of a currently selected power source of the handheld projection system, wherein the currently selected power source comprises one of (a)(i) an internal power source internal to the projection system that includes a drive unit for use with the internal power source and (a)(ii) an external power source external to the projection system that includes a distinct drive unit for use with the external power source, wherein a respective drive unit of the currently selected power source is configured (b)(i) to control image generation of said projection device and (b)(ii) to operate the projection device at the corresponding drive power mode, so that the quality of the projected image is adjusted on the basis of the power source of the handheld projection system via the respective drive unit of the currently selected power source, wherein the external power source comprises a mains power line, and the system is connected to the mains power line by means of a power adapter, wherein said power adapter comprises the distinct drive unit for use with the external power source arranged to drive the projection device at the drive power mode selected by the selection device when the mains power line is the currently selected power source.

11. A system as claimed in claim 10, wherein the drive power mode of the projection device is selected automatically.

12. A system as claimed in claim 10, further comprising a detection device for detecting the power source of the handheld projection system.

13. A system as claimed in claim 10, wherein said at least two drive power modes are associated with different lumen outputs of the projection device.

14. A system as claimed in claim 10, further comprising a switch for manually overriding the selection of the drive power mode made by the selection device.

15. A system as claimed in claim 10, wherein the projection device comprises at least one solid-state light source.

16. A system as claimed in claim 15, wherein said light source is at least one LED component.

17. A system as claimed in claim 15, wherein said light source is at least one laser component.

18. A system as claimed in claim 17, wherein the projection device further comprises a scanner for scanning a laser beam originating from said at least one laser component over the projection surface.

* * * * *